June 2, 1925.
L. A. DUNAJEFF
PICTURE TRANSMITTING APPARATUS
Filed Oct. 24, 1921
1,540,318
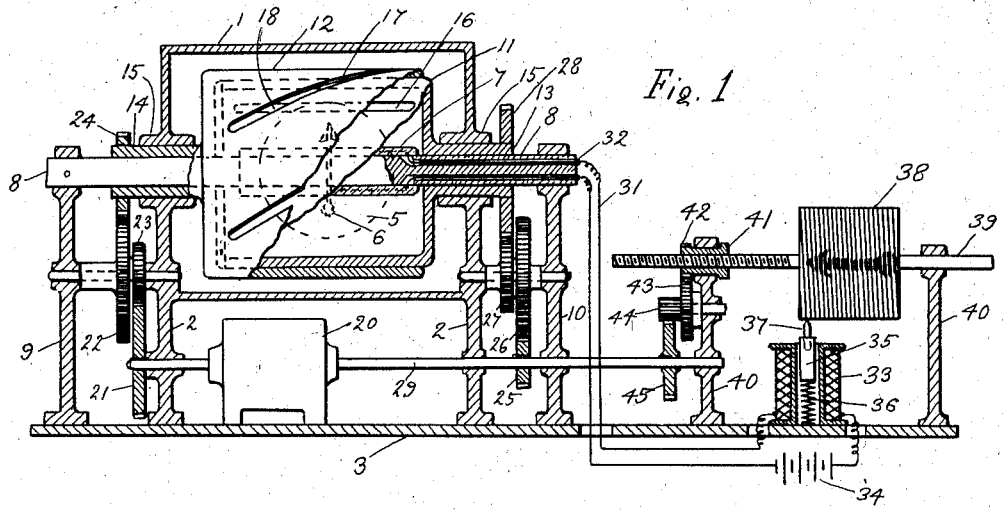
Fig. 1
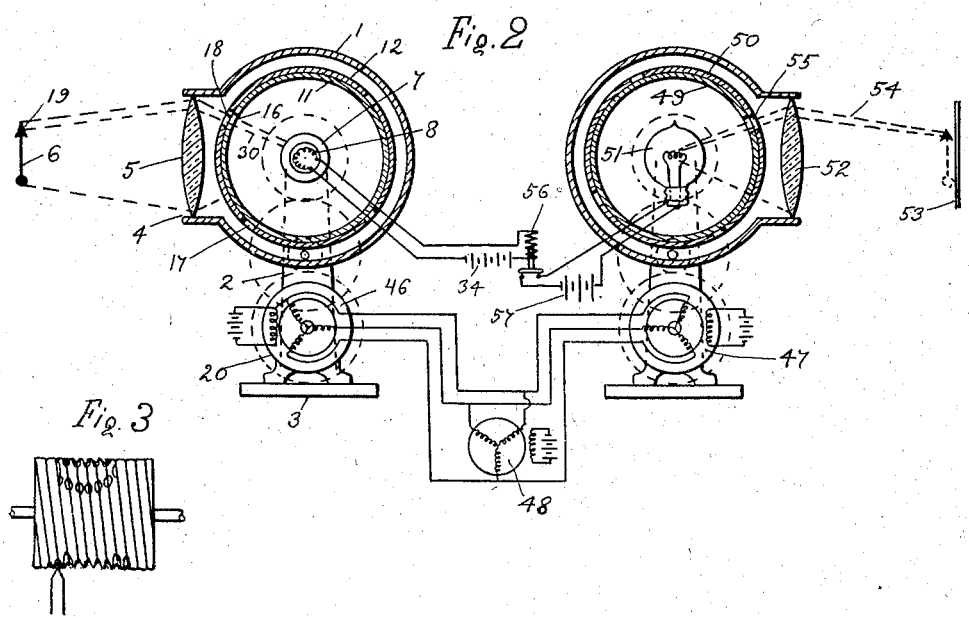
Fig. 2
Fig. 3
INVENTOR
LEONID A. DUNAJEFF
BY John P. Nixonow
ATTORNEY Patented June 2, 1925.

1,540,318

UNITED STATES PATENT OFFICE.

LEONID A. DUNAJEFF, OF NEW YORK, N. Y.

PICTURE-TRANSMITTING APPARATUS.

Application filed October 24, 1921. Serial No. 510,095.

*To all whom it may concern:*

Be it known that I, LEONID A. DUNAJEFF, citizen of the United States, and resident of New York, in the county of New York and State of New York, have invented certain new and useful Improvements in Picture-Transmitting Apparatus, of which the following is a specification.

My invention relates to picture transmitting apparatus and has a particular reference to apparatus in which pictures are transmitted at a distance and reproduced by means of photoelectric cells, such as selenium cells, in which the resistance to the passage of the electric current varies with the variations of the illumination of such cells.

The object of my invention is to provide an apparatus in which between an image of the object and the photoelectric cell movable screens are interposed with slots, forming small moving apertures, gradually covering the whole image of the object. With this arrangement the photoelectric cell receives various degrees of illumination according to the quantity of light received from the successive portions of the image, and the current, passing through the cell, varies accordingly. This current is used then to reproduce the picture of the image at any practical distance.

My invention is more fully described in the accompanying specification and drawing in which—

Fig. 1 is a sectional elevation of my apparatus with a mechanical reproducing device, Fig. 2 is a cross section of a device adapted for reproducing pictures on a screen or on a photographic film, and Fig. 3 is a detail of a mechanical reproducing device.

My apparatus consists of a housing 1 mounted on supporting feet 2 on a common bed plate 3. The housing has a cylindrical form and is provided with an aperture 4 on one side with a lens 5. This lens is adapted to receive the light from an object 6 and to direct the image of this object towards the center of the housing, where a photoelectric (usually selenium) cell 7 is mounted on a stationary shaft 8 supported on brackets 9 and 10.

Instead of admitting the whole image or the whole beam of light from the lens 5 on the selenium cell, I provide a mechanism for separating the image into small portions and for successively projecting on the selenium cell light from these portions only. I accomplish this by means of a movable aperture, travelling from one end of picture to the other and stepping down for each new passage, so that in the end the whole image of the object is uniformly covered by this aperture in its movement.

For this purpose I provide two concentric drums, 11 and 12, mounted with their extensions 13 and 14 on the shaft 8 and between the bearings 15 in the housing 1. These drums can rotate on the shaft 8 independently from each other, with different velocities, or even in the opposite directions.

The inside drum 11 is provided with one or more longitudinal slots 16, and the outside drum 12 has slots 17, placed at an angle with the slots 16. The point of intersection 18 of these slots forms an aperture through which the light reaches selenium cell 7 from a small portion 19 of the object 6.

The drum 12 receives a comparatively rapid rotation from a motor 20 through a train of gears 21, 22, 23 and 24, while the drum 11 receives a comparatively slower rotation from the same motor shaft 29 through a train of gears 25, 26, 27 and 28. The velocities of rotation are so proportioned, that while the slot 16 moves through a distance equal to its width, the angular slot 17 moves through a distance equal to its pitch, or to the peripheral distance from its beginning to its end, so that during the time of this movement the aperture 18, formed at the point of intersection of the two slots, moves longitudinally from one end of the drum, where the slots begin, to the other, where they end. The small beam of light 30, passing through this aperture, describes a straight line on the selenium cell, covering one narrow portion of the image of the object 6.

The angular slots are equally spaced at such distances, that while the upper end of the first slot just moves from the slot 16, the lower end of the next angular slot begins to cover the other end of the slot 16, thereby beginning to form a new strip of light on the selenium cell from the next lower strip of the image. The whole beam of light, passing through the objective lens 5, will be successively projected on the selenium cell in horizontal strips, and each strip will be successively projected in small spots.

The wires 31 from the selenium cell 7 are placed in insulating tubes 32 inside of the stationary shaft 8 and are connected to a solenoid 33 on the receiving end, with a source of the electric current 34 in the line.

An iron plunger 35 on a spring 36 is placed in the solenoid. The spring pushes the plunger from the solenoid, and the current pulls it in with the force proportional to the strength of the current or to the degree of illumination of the selenium cell. A writing point 37 is attached to the plunger.

It is evident, of course, that any other similar electromagnetic arrangement may be used in this case to operate the writing point.

The writing point 37 bears against the surface of a drum 38 on a shaft 39 supported in brackets 40. One end of this shaft is threaded and placed in a stationary nut 41 with a gear 42, operated by gears 43, 44 and 45 from the shaft 29 of the motor 20. The diameter of the drum and its speed of rotation are so proportioned, that the drum makes one revolution, when the aperture 18 passes from one end of the slot 16 to the other, and the screw pitch is so proportioned, that with the next revolution the drum moves axially for a distance, proportional to the amount of the peripheral movement of the slot 16 (which ordinarily is equal to its width).

The drum 38 is made on its periphery of some plastic material, so that the writing point 37, being pressed by the spring, leaves a scratch or a groove on the drum surface. The depth of this groove varies with the variations of the spring pressure, or inversely with the variations of the electric current. Consequently the writing point will make deep grooves at the dark points of the image, and shallow grooves on the places corresponding to lighted spots of the image, or, in other words, the writing point will engrave the picture on the drum surface. Pictures may be printed directly from this drum on a paper, or metal cuts may be made from the drum in an ordinary manner.

The grooves on the drum are shown somewhat exaggerated in Fig. 3 which illustrates deep scratches corresponding to the dark spots.

In this arrangement the deep grooves are produced by the spring action, and the electromagnetic force relieves the pressure on the writing point. An opposite arrangement may be used, however, when it is so desired, producing deep grooves by the electromagnetic pull on the writing point.

Instead of making grooves with a sharp point, an ordinary pencil may be used in the plunger 35, and a sheet of paper attached to the surface of the drum 38. In this case the picture will be drawn directly on the paper, the pencil lines varying in thickness in an inverse proportion with the strength of the current transmitted.

The receiving drum 38 may be placed at any distance from the object 6 and rotating drums 11 and 12, provided, that their rotational velocities are kept uniform and in a correct ratio with each other. Fig. 2 illustrates one method for accomplishing this. Here the transmitting and receiving apparatus are driven by synchronous electric motors 46 and 47, receiving their current from the same electric generator 48.

Instead of directly drawing or engraving the picture transmitted, it may be photographed or projected on a screen. In this case the receiver is made like the transmitter, with similar inside and outside drums 49 and 50, driven at the same speeds as the drums 11 and 12. Only inside of these drums instead of the selenium cell an electric lamp 51 is placed, and the light from this lamp is directed on an objective lens 52 to be projected on a screen of photographic film 53. Only a small beam of light 54 is projected at a time through the point of intersection of the slots 55. It is possible, however, to rotate the drums with such speed, that the whole picture is projected or traced on the screen in a small fraction of a second, so that the eye will receive an impression of an uninterrupted picture. The lamp 51 receives the current through the selenium cell 7 which varies with the variations of the primary illumination from the object 6. When picture is transmitted at a considerable distance, a relay 56 may be used in connection with a separate local source of current 57.

Important advantages of my invention are that it can be used for a direct mechanical reproduction of the pictures from objects, and that these pictures or reproductions can be transmitted at a distance.

I claim as my invention:

1. In a picture transmitting apparatus, the combination with a housing, a shaft in said housing, a hollow cylindrical drum mounted on said shaft inside of said housing, a plurality of slots in said drum, a second drum mounted on said shaft concentrically with said first drum, a plurality of longitudinal slots in said second drum at an angle with slots in said first drum, a photoelectric element inside of said drums, a lens adapted to concentrate a light from an object on said photoelectric element through a point of intersection of said slots, means to rotate said drums with different velocities, an electric circuit comprising said photoelectric element, and means to reproduce the image of said object at a distance by recording the current variations of said circuit caused by the variations of the intensity of lighting of said photoelectric element.

2. In a picture transmitting apparatus, the combination with a housing, a hollow cylindrical drum rotatively mounted inside of said housing, a plurality of longitudinal slots in said drum, a second hollow drum mounted concentrically with said first drum, a plurality of longitudinal slots in said second drum at an angle with slots in said first drum, means to rotate said drums at different velocities so that the slot of a faster moving drum traverses the slot of a slower moving drum from end to end, while said slot of a slower moving drum is displaced at a distance equal to its width, a photoelectric element inside of said drums, an electric circuit comprising said photoelectric element, an aperture in said housing, means to direct rays from an object on said photoelectric element through said aperture and through the instantaneous point of intersection of said slots, and means to reproduce the image of said object at a distance by recording current variations of said electric circuit caused by the variations of the intensity of the lighting of said photoelectric element.

3. In a picture transmitting apparatus, the combination with a stationary shaft, a hollow cylindrical drum rotatively mounted on said shaft, a plurality of slots in said drum, a second hollow drum mounted on said shaft concentrically with said first drum, a plurality of slots in said second drum at an angle with said slots of the first drum, means to rotate said drums at different velocities so that the slot of a faster moving drum traverses the slot of a slower moving drum from end to end while said slot of a slower moving drum is displaced at a distance equal to its width, a photoelectric element inside of said drums, an electric circuit comprising said photoelectric element, means to direct the light from an object on said photoelectric element through the instantaneous point of intersection of said slots, a second pair of identical drums, means to rotate said second pair of drums at a speed synchronous with the speed of said first drums, a source of light in said second pair of drums, said source of light being included in said electric circuit, and means to direct the light from said source on a screen through a point of intersection of the slots of said second drums.

4. In a picture transmitting apparatus, the combination with a shaft, a hollow cylindrical drum mounted on said shaft, a plurality of slots in said drum, a second hollow drum mounted concentrically with said first drum, a plurality of slots in said second drum at an angle with slots of said first drum, a photoelectric element inside of said drums, an electric circuit comprising said photoelectric element, means to direct light rays from an object on said photoelectric element through said slots in said drums, means to rotate said drums at such speeds that an instantaneous point of intersection of said slots successively traverses the whole field of said rays, a second pair of drums identical with said first pair of drums, an electric lamp inside of said second pair of drums, said lamp being included in said electric circuit, means to rotate said second pair of drums at speeds synchronous with speeds of said first pair, a screen in a coordination with said second pair of drums, and means to direct the light from said lamp on said screen through the slots in said second pair of drums.

Signed at New York, in the county of New York and State of New York, this 22nd day of October A. D. 1921.

LEONID A. DUNAJEFF.